(12) United States Patent
Hübner et al.

(10) Patent No.: US 12,132,231 B2
(45) Date of Patent: Oct. 29, 2024

(54) LAYERED STRUCTURE FOR A FUEL CELL AND METHOD FOR PRODUCING A LAYERED STRUCTURE OF THIS TYPE

(71) Applicants: AUDI AG, Ingolstadt (DE); Volkswagen AG, Wolfsburg (DE)

(72) Inventors: Gerold Hübner, Braunschweig (DE); Tanja Graf, Braunschweig (DE); Thomas Schladt, Braunschweig (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 836 days.

(21) Appl. No.: 17/266,518

(22) PCT Filed: Jul. 8, 2019

(86) PCT No.: PCT/EP2019/068221
§ 371 (c)(1),
(2) Date: Feb. 5, 2021

(87) PCT Pub. No.: WO2020/030355
PCT Pub. Date: Feb. 13, 2020

(65) Prior Publication Data
US 2021/0305589 A1    Sep. 30, 2021

(30) Foreign Application Priority Data
Aug. 7, 2018  (DE) .................. 10 2018 213 148.1

(51) Int. Cl.
*H01M 8/0234* (2016.01)
*H01M 4/86* (2006.01)
(Continued)

(52) U.S. Cl.
CPC ....... *H01M 8/0234* (2013.01); *H01M 4/8605* (2013.01); *H01M 4/8642* (2013.01);
(Continued)

(58) Field of Classification Search
None
See application file for complete search history.

(56) References Cited

U.S. PATENT DOCUMENTS

2005/0142433 A1   6/2005   Ueda et al.
2005/0255373 A1   11/2005  Kimura et al.
(Continued)

FOREIGN PATENT DOCUMENTS

DE           197 37 389 A1    3/1998
DE      10 2007 056 120 A1   12/2008
(Continued)

*Primary Examiner* — Chinessa T. Golden
(74) *Attorney, Agent, or Firm* — Seed IP Law Group LLP

(57) ABSTRACT

A layered structure for a fuel cell comprises a carbon-based catalyst-free gas diffusion layer substrate and a carbon-based microporous layer, which is joined to the gas diffusion layer substrate and comprises a plurality of carbon carriers or carbon fibers embedded into an ion-conducting polymer binder mixture. The polymer binder mixture comprises a sulfur-free binding polymer and a sulfonated polymer, and a fraction of the binding polymer at or near a surface of the microporous layer facing away from the gas diffusion layer substrate is less than or equal to a fraction of the sulfonated polymer. A method for producing a layered structure of this type is also provided.

7 Claims, 2 Drawing Sheets

(51) Int. Cl.
*H01M 8/0239* (2016.01)
*H01M 8/0243* (2016.01)
*H01M 8/0245* (2016.01)
*H01M 8/1004* (2016.01)
*H01M 8/10* (2016.01)

(52) U.S. Cl.
CPC ....... *H01M 8/0239* (2013.01); *H01M 8/0243* (2013.01); *H01M 8/0245* (2013.01); *H01M 8/1004* (2013.01); *H01M 2008/1095* (2013.01)

(56) References Cited

U.S. PATENT DOCUMENTS

| | | | |
|---|---|---|---|
| 2006/0257641 A1 | 11/2006 | Cho et al. | |
| 2009/0104508 A1 | 4/2009 | Lee | |
| 2011/0008705 A1* | 1/2011 | Zheng | B82Y 30/00 |
| | | | 429/480 |
| 2011/0008706 A1 | 1/2011 | Cipollini | |
| 2016/0064755 A1* | 3/2016 | Hubner | H01M 8/0241 |
| | | | 429/413 |
| 2018/0053955 A1 | 2/2018 | Weber et al. | |

FOREIGN PATENT DOCUMENTS

| | | |
|---|---|---|
| DE | 10 2013 207 900 A1 | 10/2014 |
| DE | 10 2015 108 325 A1 | 12/2015 |
| DE | 10 2015 114 454 A1 | 3/2016 |
| JP | 2004-039416 A | 2/2004 |
| JP | 2011-519134 A | 6/2011 |
| WO | 03/058743 A2 | 7/2003 |
| WO | 2007/050460 A2 | 5/2007 |
| WO | 2009/131554 A1 | 10/2009 |
| WO | 2015/101772 A1 | 7/2015 |

\* cited by examiner

LAYERED STRUCTURE FOR A FUEL CELL AND METHOD FOR PRODUCING A LAYERED STRUCTURE OF THIS TYPE

BACKGROUND

Technical Field

Embodiments of the invention relate to a layered structure for a fuel cell, comprising a carbon-based catalyst-free gas diffusion layer substrate and a carbon-based microporous layer, which is joined to the gas diffusion layer substrate and comprises a plurality of carbon carriers or carbon fibers embedded into an ion-conducting polymer binder mixture. Embodiments of the invention furthermore relate to a method for producing a layered structure of this type.

Description of the Related Art

Layered structures of the type mentioned at the outset form so-called gas diffusion electrodes, an electrode being arranged on each of the two sides of the membrane of a fuel cell. The fuel cells are used to provide electrical energy by way of an electrochemical reaction between a fuel, in general hydrogen, and an oxygen-containing gas, in general air. The fuel cell typically comprises a membrane electrode assembly, in which the anode is formed on one side of the membrane, and the cathode is formed on the other side. The anode is fed hydrogen gas, while the cathode is supplied with air. The reactants are conducted via channels formed in bipolar plates into the gas diffusion layer, which essentially distributes these across a large area before they enter the abutting microporous layer, so as to be split into protons and electrons at a catalyst layer on the anode side (oxidation) or so as to be converted into product water on the cathode side, taking up electrons (reduction).

US 2006/0257641 A1 describes an electrode substrate for a fuel cell, which comprises a gas diffusion layer and a two-part microporous layer, wherein a portion of the two parts of the microporous layer is embedded into the gas diffusion layer. A catalyst layer is applied to the other portion of the microporous layer.

WO 03/058743 A2 likewise describes a layered structure that can be used in a fuel cell, composed of a gas diffusion layer formed of carbon fibers, wherein the carbon fibers are coated with a fluorinated polymer. A microporous layer, which comprises carbon particles embedded into a second, or the same, fluorinated polymer, is applied onto this gas diffusion layer. This configuration is used to manage water inside the fuel cell.

A gas diffusion layer and a microporous layer applied thereto are also described in WO 2015/101772 A1, wherein the microporous layer is designed with regions having differing porosities. As an alternative, the microporous layer can also be assembled from a material having hydrophobic properties on the one hand, and a material having hydrophilic properties on the other hand.

DE 197 37 389 A1 describes a gas diffusion electrode for a fuel cell, which comprises an anisotropic gas diffusion layer and a catalytic layer. The gas diffusion layer is composed of a porous carbon matrix, through which carbon particles and polyethersulfone are distributed so that the matrix is homogeneously porous in a direction lateral to the gas flow, and is asymmetrically porous to gases in a direction of the gas flow. A catalytic layer comprising catalytic carbon particles and a thermoplastic polymer can be applied onto the gas diffusion layer. The catalytic layer has only a low metal catalyst loading between 0.2 and 0.5 milligrams per square centimeter.

In the case of gas diffusion electrodes known from the prior art, a solution of the polymer of the membrane is applied to the microporous layer furnished with the catalyst metal after the catalyst metal coating has been applied. In the process, there is the risk that the atoms of the catalyst metal are unevenly wetted with the ionomer forming the membrane, so that the ionomer solution closes the pores formed in the carbon and/or formed in the binding polymer of the microporous layer. An impregnation with ionomer chronologically after the application of the catalyst metal can thus result in diffusion limitations within the microporous layer. If, in contrast, the ionomer were applied to the microporous layer chronologically before the catalyst metal, this entails the risk, depending on the application method of the catalyst, that the ionomer becomes damaged during the subsequent deposition of the catalyst metal, and potentially loses the proton-conducting function thereof completely.

BRIEF SUMMARY

A layered structure of the type mentioned at the outset is described herein. A method for producing a layered structure of this type is also described herein.

A layered structure is in particular characterized in that a fraction or a concentration of the binding polymer, in the microporous layer, at or near a surface of the microporous layer which faces away from the gas diffusion layer substrate is less than or equal to a fraction or concentration of the sulfonated polymer.

Using a microporous layer thus designed, functional groups form a covalent, and thus more stable, bond with the carbon present in the microporous layer or with the binding polymer contained therein.

In addition, it is prevented that porous regions of the microporous layer become clogged, since an impregnation of the microporous layer with an ionomer solution is no longer required chronologically after the application of the catalyst coating. In this way, neither the pores in the carbon carriers or the carbon fibers, nor the pores of the sulfur-free binding polymer are blocked, which are necessary for the inflow of reactants and for the water management of the fuel cell.

Since the impregnation with an ionomer is dispensed with, furthermore a lower ability to swell in water or a reduced volume expansion during moisture fluctuations is observed. In addition, damage to the ionomer during a subsequent catalyst coating is prevented. Ultimately, the catalytically active surface of the catalyst metal is also not blocked by an excessively thick ionomer layer, which would result in a decrease in the reaction rate of the fuel cell.

Sulfur-free binding polymers can be polytetrafluoroethylene (PTFE) or ethylene-tetrafluoroethylene (ETFE) copolymer, for example. For example, perfluorinated sulfonic acid (PFSA), a sulfonated hydrocarbon polymer, sulfonated polyether ether ketone (sPEEK), polysulfone (such as sPSU), polyethersulfone (PES) or the like can be used as the sulfonated polymer.

It may be advantageous when the binding polymer and the sulfonated polymer are evenly distributed in the volume of the microporous layer. In this way, it is possible to achieve optimized ionic binding of the catalyst metal that is applied subsequently by way of an atomic layer deposition (ALD) method. At the same time, however, it is also ensured that a limited fraction or a residual concentration of the ionomer is still present at or near the surface of the microporous layer which faces away from the gas diffusion layer substrate, which is essential for the water management of the fuel cell. Experiments have shown that metal catalysts can be deposited only poorly on the sulfur-free binding polymer, so that a sufficiently large fraction of sulfonated polymer is present at the surface of the microporous layer, which does not impair the deposition, or at least to a lesser degree than the binding polymer does.

The water management and the depositability of the catalyst metal are additionally favored when the fraction of the binding polymer in the microporous layer increases in the direction of the gas diffusion layer substrate, and when the fraction of the sulfonated polymer decreases in the direction of the gas diffusion layer substrate, in particularly in a manner that is complementary to the increase in the concentration of the binding polymer. In this way, it is ensured that the catalyst metal can be successfully deposited on the side of the microporous layer which faces the membrane, using an atomic layer deposition method, and, at the same time, the later water transport of the fuel cell out of the microporous layer toward the gas diffusion layer substrate is not impaired.

In this connection, it has been found to be favorable when the fraction of the binding polymer increases incrementally in the direction of the gas diffusion layer substrate. The microporous layer can thus be built in layers using the polymer binder mixture, wherein the distribution of the fractions of the binding polymer and of the sulfonated polymer is changed layer-wise or incrementally.

In addition, it may be advantageous when the fraction of the binding polymer increases continuously in the direction of the gas diffusion layer substrate, and thus a graded distribution, consequently a concentration gradient, is present.

A corresponding distribution of the sulfur-free binding polymer and of the sulfonated polymer across the microporous layer can also be achieved by the carbon carriers of the microporous layer comprising first carbon particles at a first volume region facing away from the gas diffusion layer substrate, and second carbon particles at a second volume region facing the gas diffusion layer substrate, and by the first and/or second carbon particles being provided with a coating for functionalization. This coating can, for example, be a sulfonated polymer, so that a proton-conducting function is imparted to the carbon particles. There is also the option of the carbon particles themselves, that is directly, being sulfonated, dispensing with a polymer. In the process, these proton-conducting, functionalized carbon particles may be assigned to the first volume region which faces away from the gas diffusion layer substrate. As an alternative or in addition, the second carbon particles can be coated with a silicate, with titanium dioxide ($TiO_2$) or with silicon dioxide ($SiO_2$), which increases the ability thereof to be wetted with water. The hydrophilic, functionalized carbon particles contribute to the water management within the microporous layer. For this reason, the hydrophilic second carbon particles may be arranged in the second volume region of the microporous layer, which faces the gas diffusion layer substrate or even directly abuts the same. Water is thus conducted by way of the hydrophilically functionalized carbon particles to the gas diffusion layer substrate, which is furnished with larger pores compared to the microporous layer.

In addition, the option exists to supplement the binding polymer with proton-conducting groups for functionalization. For this purpose, for example, sulfur trioxide, vinyl sulfone or vinylphosphonic acid can be deposited on the binding polymer, and may form plasma. As an alternative or in addition, these substances can also be directly deposited on the carbon. In the process, it must be ensured that potential porous structures are not closed completely, which could adversely affect the water management. In addition, the supply of the reactants to the catalyst coating or to the catalyst particles should not be blocked.

So as to refine the layered structure to form a gas diffusion layer electrode that supports the reaction of the fuel cell, a catalyst coating is applied, or introduced into the microporous layer, from the side of the microporous layer which faces away from the gas diffusion layer substrate, in particular onto the carbon fibers or carbon carriers thereof. Catalyst metals may be used for this purpose, which are selected from a group consisting of precious metals such as platinum, ruthenium, palladium or the like. It is also possible to use alloys comprising these precious metals as the catalyst coating. It may be advantageous when the catalyst coating is applied using the atomic layer deposition method, since it is then possible to form only very thin layers, using little material. The catalytically active precious metals are very expensive, so that atomic layer deposition is a method in which the costs for producing the layered structure can be kept very low.

A method for producing a layered structure for a fuel cell comprises, in particular, the following steps:

providing a carbon-based (for example, fibers, threads, papers or the like) catalyst-free gas diffusion layer substrate;

embedding a plurality of carbon carriers or carbon fibers into an ion-conducting polymer binder mixture comprising a sulfur-free binding polymer and a sulfonated polymer;

forming a microporous layer, in which a fraction of the binding polymer at or near a surface of the microporous layer which faces away from the gas diffusion layer substrate is less than or equal to a fraction of the sulfonated polymer; and applying a catalyst metal or a catalyst metal alloy onto the surface facing away from the gas diffusion layer substrate or from the side of the microporous layer which faces away from the gas diffusion layer substrate.

As a result of the above-described method, a gas diffusion electrode is thus formed, in which the catalyst metal is applied onto the side of the microporous layer which faces away from the gas diffusion layer substrate. Due to the lower fraction of the binding polymer on this side of the microporous layer, the catalyst metal can be deposited in an operationally reliable manner, and the deposition is not impaired by an excessively high fraction of the sulfur-free binding polymer. Nonetheless, a fraction of the sulfur-free binding polymer is present on the side of the microporous layer which faces away from the gas diffusion layer substrate, which contributes to the water management of the fuel cell.

An even coating with the catalyst metal can be achieved by an atomic layer deposition method, wherein the application of the catalyst metal is carried out using one cycle or using multiple cycles, which encompass the following steps:

applying an amount of atoms, or of molecular compounds, corresponding to a sub-monolayer, comprising the catalyst metal, onto the microporous layer forming a substrate;

applying a precursor, or a passivation gas, onto the microporous layer for the passivation of the atoms, or of the molecular compounds, of the catalyst metal; and applying a further amount of atoms, or molecular compounds, corresponding to a sub-monolayer, comprising the catalyst metal.

Experiments have shown that catalyst metals, in particular platinum, tend toward island growth during deposition. This means that a platinum atom prefers to "sit" on one or more other platinum atoms, and the substrate is only completely covered when a sufficiently large amount of the catalyst metal is used. So as to address this problem, a precursor, or also a passivation gas, such as carbon monoxide (CO), is used, which "occupies" the already deposited platinum atoms, so that subsequent platinum atoms are essentially only deposited on free spaces of the substrate, and in this way a more homogeneous catalyst coating with the catalyst metal is created.

During the first cycle step, for example, it is likewise possible to use a precursor that already comprises platinum, such as trimethyl(methylcyclopentadienyl) platinum, for example. In a cycle intermediate step, a precursor (such as oxygen or plasma from oxygen) is then applied for the oxidation of the molecular compounds deposited into the microporous layer, if necessary while heating the substrate (for example, to more than 220 degrees Celsius). In the process, the catalyst metal continues to adhere to the substrate and is "exposed." Thereafter, the second cycle step of the passivation with a precursor, or a passivation gas (such as CO), is carried out, before again the precursor comprising the platinum is applied onto the substrate.

So as to, in any case, ultimately desorb further undesirable molecules from the microporous layer, it may be advantageous when the microporous layer is rinsed with a carrier gas at the end of every cycle. For example, oxygen may be used as the carrier gas.

It may be advantageous for the deposition of the catalyst when the carbon carriers of the microporous layer are designed as carbon particles, which are functionalized chronologically before the application of the catalyst metal. As an alternative or in addition, there is also the option that one or more of the polymers of the polymer binder mixture are functionalized chronologically before the application of the catalyst metal. The coating for the functionalization may be applied only subsequently, that is, after the microporous layer has been formed, onto the microporous layer or introduced therein from the side facing away from the gas diffusion layer substrate.

So as to be able to produce a fuel cell in a particularly simple manner, it may be advantageous when the gas diffusion layer and the microporous layer comprising the catalyst metal are hot-pressed with a membrane, to form an assembly comprising a gas diffusion electrode and a membrane. With this, the production of a catalyst-coated membrane (CCM) based on pastes made of a supported platinum catalyst can be dispensed with. In contrast to what is known from the prior art, the electrode is now assigned to the microporous layer, and thus also to the gas diffusion layer before it is pressed together with the membrane.

BRIEF DESCRIPTION OF THE SEVERAL VIEWS OF THE DRAWINGS

Further advantages, features and details are provided in the claims, the following description, and the drawings.

DETAILED DESCRIPTION

Figure 1:
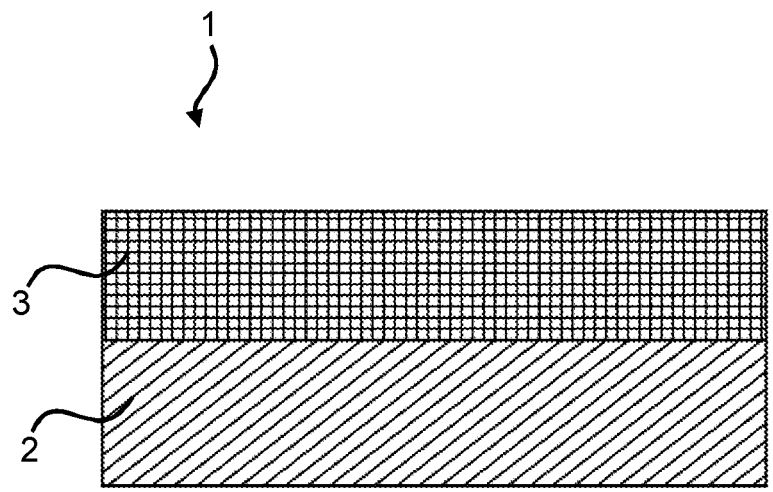
FIG. 1 shows a schematic sectional illustration of a first layered structure of a fuel cell.

In a polymer electrolyte membrane (PEM) fuel cell, fuel or fuel molecules, in particular hydrogen, is or are split into protons and electrons at a first electrode (anode). The membrane 9 abutting the anode allows the protons (such as $H^+$) to pass, but is impermeable to the electrons (e). The membrane 9 is formed of an ionomer, such as a sulfonated tetrafluoroethylene (PTFE) polymer or a polymer of perfluorinated sulfonic acid (PFSA). As an alternative, the membrane 9 can also be formed as a sulfonated hydrocarbon membrane. The following reaction takes place at the anode: $2H_2 \rightarrow 4H^+ + 4e^-$ (oxidation/electron loss). While the protons pass through the membrane 9 to the second electrode (cathode), the electrons are conducted via an external circuit to the cathode or to an energy store. A cathode gas, in particular oxygen or oxygen-containing air, is provided at the cathode, so that the following reaction takes place here: $O_2 + 4H^+ + 4e^- \rightarrow 2H_2O$ (reduction/electron gain).

Embodiments described herein relate to the production and the use of gas diffusion electrodes in a fuel cell.

The figures, in this regard, show different layered structures 1 for a fuel cell, which all comprise a carbon-based catalyst-free gas diffusion layer substrate 2 and a, likewise carbon-based, microporous layer 3 joined to this gas diffusion layer substrate 2. A plurality of carbon carriers 4 or carbon fibers are embedded into the microporous layer 3 in an ion-conducting polymer binder mixture. The polymer binder mixture comprises a sulfur-free binding polymer and a sulfonated polymer, wherein a fraction or a concentration of the binding polymer at or near a surface or side of the microporous layer 3 which faces away from the gas diffusion layer substrate 2 is less than or equal to a fraction or concentration of the sulfonated polymer.

In the present case, the sulfur-free binding polymer is polytetrafluoroethylene (PTFE), which plays a decisive role in the water management of the fuel cell. The sulfonated polymer is, for example, a perfluorinated sulfonic acid (PFSA), and is thus responsible for the proton transport. The latter imparts the ion conductivity to the polymer binder mixture.

In the example of the layered structure 1 according to FIG. 1, the PTFE and the proton-conducting polymer are evenly distributed in the volume of the microporous layer 3, which is illustrated by checkered illustration. As a result of this even distribution, however, it is also ensured that the fraction of the sulfonated polymer at or near the surface of the microporous layer 3 which faces away from the gas diffusion layer substrate 2 does not exceed the fraction of the sulfonated polymer, so that a subsequent deposition of atoms or molecules of a catalyst metal on the microporous layer 3 is not impaired by the PTFE.

Figure 2:
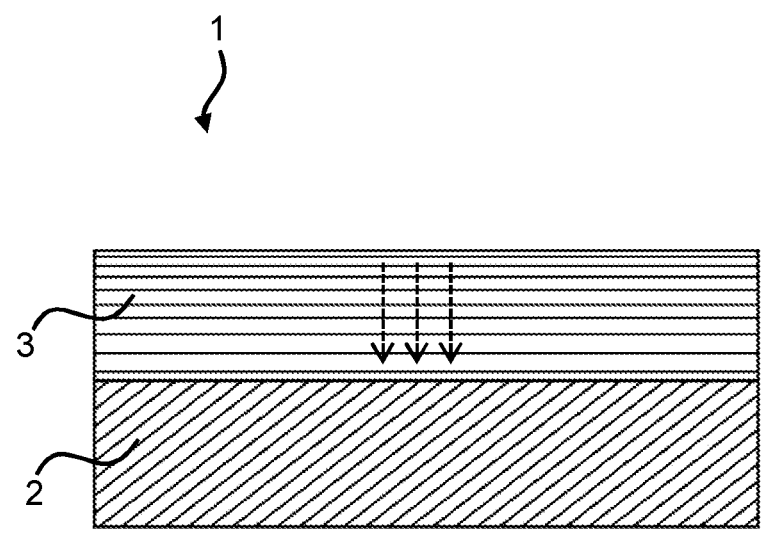
FIG. 2 shows a schematic sectional illustration of a second layered structure of a fuel cell.

The layered structure 1 according to FIG. 2 differs from that of FIG. 1 in that a graded distribution of the PTFE and of the proton-conducting sulfonated polymer is present within the microporous layer 3. The fraction of the binding polymer increases evenly in the direction of the gas diffusion layer substrate 2, which is indicated by the three arrows in the figure. The fraction of the sulfonated polymer decreases evenly, a complementary manner, in the direction of the gas diffusion layer substrate 2. As an alternative, however, the fraction of the binding polymer can also increase incrementally in the direction of the gas diffusion layer substrate 2, wherein, in any case, it is ensured that the binding polymer does not disappear completely from the surface of the microporous layer 3 which faces away from the gas diffusion layer substrate 2, and is thus still able to play a role in the water management near the membrane 9.

Figure 3:
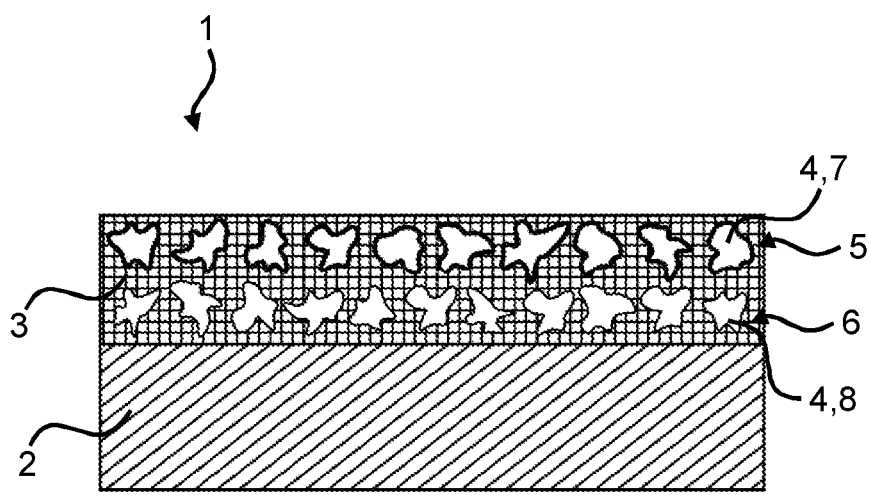
FIG. 3 shows a schematic sectional illustration of a third layered structure of a fuel cell.

The layered structure 1 according to FIG. 3 (schematically) shows the carbon carriers 4 present in the microporous layer 3, wherein first carbon particles 7 and second carbon particles 8 are present. These can, again, be embedded into a polymer binder mixture, which has an even distribution of binding polymer and sulfonated polymer within the microporous layer 3. In an alternative, however, it is also possible for a concentration gradient of the two polymers to be present in the microporous layer 3. In the process, the option exists to create the microporous layer 3 from layers having different carbon particle sizes or porosities, so as to cause the most effective penetration possible during the coating process by way of atomic layer deposition of the catalyst. It is possible, for example, to apply one or more further carbon layers onto an existing microporous layer 3 prior to the catalyst coating.

The first carbon particles 7 are located in a first volume region 5, which faces away from the gas diffusion layer substrate 2 within the microporous layer 3. The first carbon particles 7 can be functionalized in the process, for example with sulfur trioxide ($SO_3$), vinyl sulfone or vinylphosphonic acid, so that a proton-conducting function is imparted thereto, that is, so that these are functionalized. It is then possible to deposit a catalyst metal, which is platinum for example, onto these first carbon particles 7 by way of atomic layer deposition.

As an alternative or in addition, it is also possible for the carbon particles 8 arranged in a second volume region 6 of the microporous layer 3 to be functionalized, for example by being coated with a thin silicate layer, with silicon dioxide or with titanium dioxide. These substances are hydrophilic, so that the functionalization of the second carbon particles 8 results in improved water management within the microporous layer 3. As a result of this functionalization of the second carbon particles 8, it is thus possible to distribute or conduct water accumulating within the fuel cell away from the membrane 9, and toward the gas diffusion layer substrate 2.

It shall be pointed out that the functionalization of the above-described first carbon particles 7 and of the above-described second carbon particles 8 shall be understood to be only exemplary, and other functionalization remain possible. For example, functionalizations that can have an influence on the pore size within the carbon carriers 4 are also possible.

The option exists to only functionalize the carbon particles 7, 8 chronologically after they have been incorporated or after they have been embedded into the microporous layer 3. As an alternative, the carbon particles 7, 8, however, can also be functionalized chronologically before they are incorporated or before they are embedded into the microporous layer 3.

Figure 4:
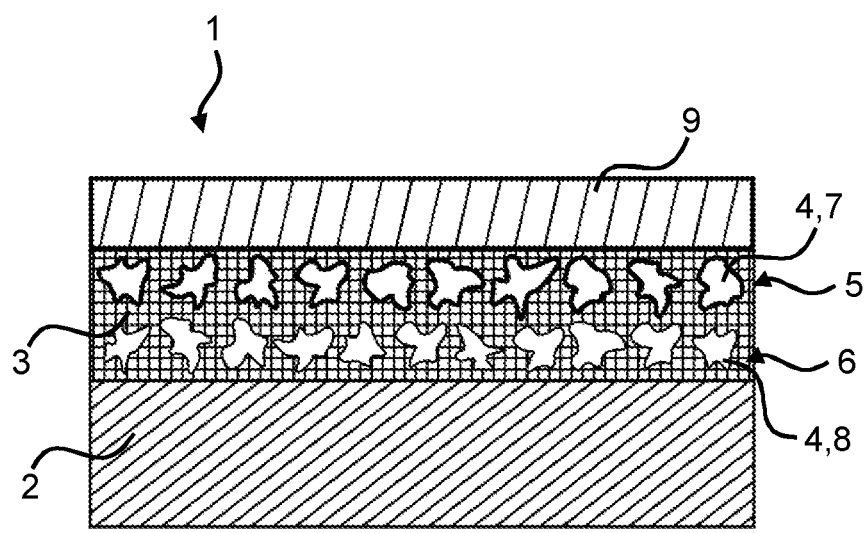
FIG. 4 shows a schematic sectional illustration of a fourth layered structure of a fuel cell.

Finally, FIG. 4 shows a layered structure 1 that is formed of a gas diffusion layer substrate 2, a microporous layer 3, and a proton-conducting membrane 9. The gas diffusion layer substrate 2 corresponds to a gas diffusion layer substrate 2 as shown in the layered structures 1 according to FIGS. 1 to 3. In the present case, the microporous layer 3 is configured similarly to the microporous layer 3 according to FIG. 3, wherein, as an alternative, the microporous layers 3 of the layered structures 1 according to FIG. 1 or 2 may also be used.

Chronologically before the membrane 9 was applied to the microporous layer 3, a catalyst coating was deposited onto the microporous layer 3 by way of an atomic layer deposition method, and in particular using a plurality of deposition cycles. In the process, a cycle count of more than 40 cycles, and in particular of more than 60 cycles, is possible, so as to ensure that a sufficient amount of catalyst metal was deposited on the microporous layer 3.

The gas diffusion layer substrate 2, the microporous layer 3 including the catalyst metal coating thereof, and the membrane 9 can now, together, be hot-pressed to form an assembly comprising a gas diffusion electrode and a membrane 9, whereby these form a unit. It shall be noted that the catalyst layer, prior to the hot-pressing step, is assigned to the gas diffusion layer substrate 2 and the microporous layer 3 joined thereto, wherein the catalyst-free membrane 9 was only subsequently added to form the layered structure 1 according to FIG. 4.

Using the features described herein, the production of a catalyst-coated membrane based on pastes comprising supported catalyst metal can thus be entirely dispensed with. The features described herein provide an entirely new approach to producing a fuel cell.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A layered structure for a fuel cell, comprising:
   a carbon-based catalyst-free gas diffusion layer substrate; and
   a carbon-based microporous layer joined to the gas diffusion layer substrate,
   wherein the carbon-based microporous layer includes a plurality of carbon carriers or carbon fibers embedded into an ion-conducting polymer binder mixture, and
   wherein the polymer binder mixture includes a sulfur-free binding polymer and a sulfonated polymer, and a fraction of the binding polymer at or near a surface of the microporous layer that faces away from the gas diffusion layer substrate is less than or equal to a fraction of the sulfonated polymer,
   wherein the fraction of the binding polymer in the microporous layer increases in the direction of the gas diffusion layer substrate, and the fraction of the sulfonated polymer decreases in the direction of the gas diffusion layer substrate, and
   wherein the fraction of the binding polymer increases continuously in the direction of the gas diffusion layer.

2. The layered structure according to claim 1, wherein the carbon carriers of the microporous layer comprise first carbon particles at a volume region facing away from the gas diffusion layer substrate, and second carbon particles at a second volume region facing the gas diffusion layer substrate, and the first and/or second carbon particles are provided with a coating for functionalization.

3. The layered structure according to claim 1, wherein a catalyst coating is applied, or introduced into the microporous layer, from the side of the microporous layer which faces away from the gas diffusion layer substrate.

4. A method for producing a layered structure for a fuel cell, comprising:

providing a carbon-based catalyst-free gas diffusion layer substrate;

embedding a plurality of carbon carriers or carbon fibers into an ion-conducting polymer binder mixture comprising a sulfur-free binding polymer and a sulfonated polymer;

forming a microporous layer, in which a fraction of the binding polymer at or close to a surface of the microporous layer facing away from the gas diffusion layer substrate is less than or equal to a fraction of the sulfonated polymer; and applying a catalyst metal or a catalyst metal alloy onto the surface facing away from the gas diffusion layer substrate or from the side of the microporous layer facing away from the gas diffusion layer substrate, wherein the fraction of the binding polymer in the microporous layer increases in the direction of the gas diffusion layer substrate, and the fraction of the sulfonated polymer decreases in the direction of the gas diffusion layer substrate, and wherein the fraction of the binding polymer increases continuously in the direction of the gas diffusion layer.

5. The method according to claim 4, wherein the application of the catalyst metal is carried out using one cycle or using a plurality of cycles encompassing:

applying an amount of atoms, or of molecular compounds, corresponding to a sub-monolayer, comprising the catalyst metal, onto the microporous layer forming a substrate;

applying a precursor, or a passivation gas, onto the microporous layer for the passivation of the atoms, or of the molecular compounds, of the catalyst metal; and applying a further amount of atoms, or molecular compounds, corresponding to a sub-monolayer, comprising the catalyst metal.

6. The method according to claim 4, wherein the carbon carriers are designed as carbon particles, which are functionalized chronologically before the catalyst metal is applied, and/or one or more of the polymers of the polymer binder mixtures are functionalized chronologically before the catalyst metal is applied.

7. The method according to claim 4, wherein the gas diffusion layer and the microporous layer comprising the catalyst metal are hot-pressed, together with a membrane, to form an assembly comprising a gas diffusion electrode and a membrane.

* * * * *